United States Patent

[11] 3,627,976

[72] Inventor James B. Stearns
Elm Grove, Wis.
[21] Appl. No. 846,502
[22] Filed July 31, 1969
[45] Patented Dec. 14, 1971
[73] Assignee Chemetron Corporation
Chicago, Ill.
Original application May 9, 1967, Ser. No. 637,169, now Patent No. 3,497,769.
Divided and this application July 31, 1969, Ser. No. 846,502

[54] NONCONSUMABLE ELECTRODE WELDING METHOD AND POWER SUPPLY
14 Claims, 7 Drawing Figs.

[52] U.S. Cl. .................................................... 219/131 R,
323/89 A, 323/89 C
[51] Int. Cl. .................................................... B23k 9/10
[50] Field of Search ............................................ 219/131,
135; 323/89 A, 89 C, 89.3, 89.12, 56; 315/284

[56] References Cited
UNITED STATES PATENTS
3,330,933 7/1967 Maklary ........................ 219/131
1,612,084 12/1926 Weed ........................... 315/126 X

| 1,968,346 | 7/1934 | Neiss | 323/56 X |
| 2,078,880 | 6/1937 | Logan | 315/284 X |
| 3,150,312 | 9/1964 | Willecke et al. | 219/131 X |
| 3,219,881 | 11/1965 | Rudaz | 219/131 X |
| 3,271,657 | 9/1966 | Gibson | 219/131 X |

Primary Examiner—J. V. Truhe
Attorney—James E. Nilles

ABSTRACT: A welding power supply suitable for nonconsumable electrode, alternating current welding at high currents, for example, welding currents exceeding 250 amperes. The power supply includes a means to unbalance the alternating current wave in a controlled manner so that the alternate half-cycles of one direction of current are greater in magnitude than the alternate half-cycles of the other direction of current. The power supply also includes a means for controlling the electric pinch effect on the arc to further facilitate high-current welding.

A method for nonconsumable electrode, alternating-current welding at high-welding currents. The method includes the step of controlling the unbalance of the current wave so that the alternate half-cycles of one direction of current are greater in magnitude than the alternate half-cycles of the other direction of current, within prescribed limits, and the step of controlling the electric pinch effect on the arc.

PATENTED DEC 14 1971

INVENTOR:
James B. Stearns
BY: James E. Nilles
ATTORNEYS

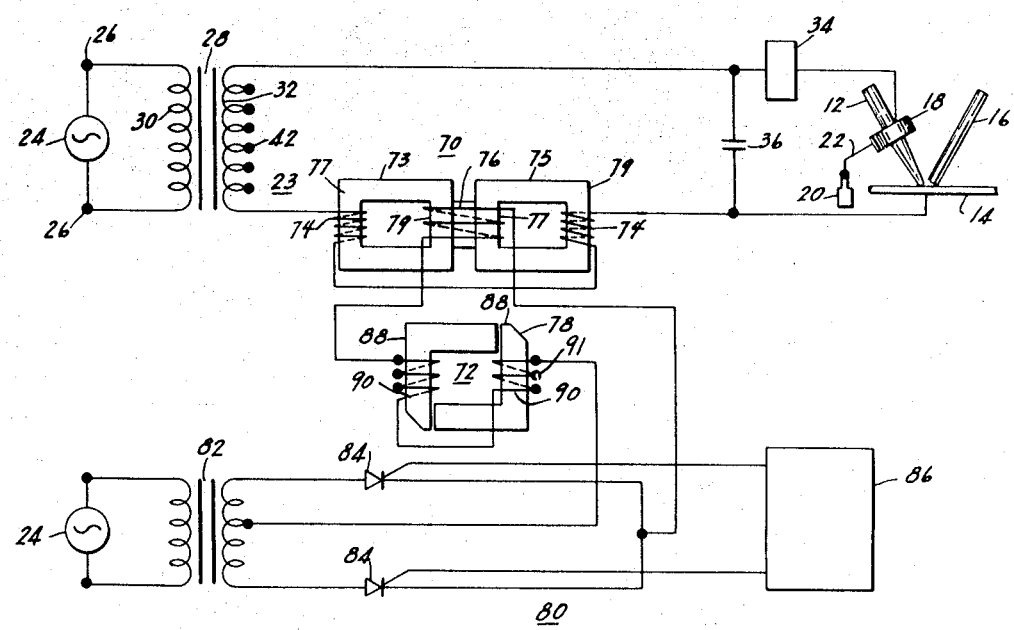
Fig. 4
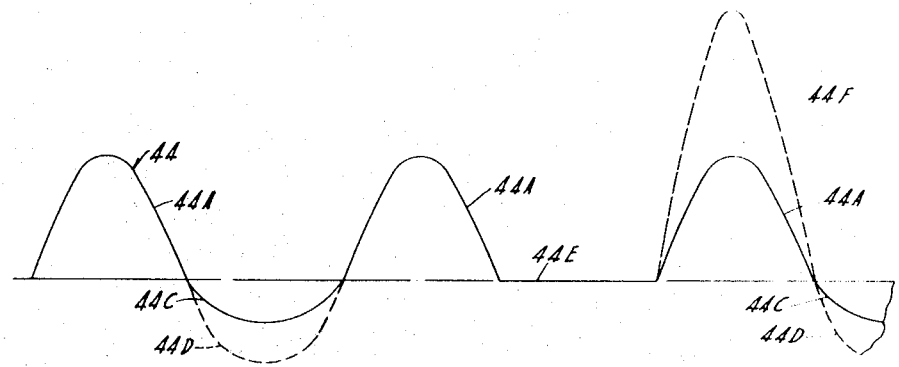
Fig. 5
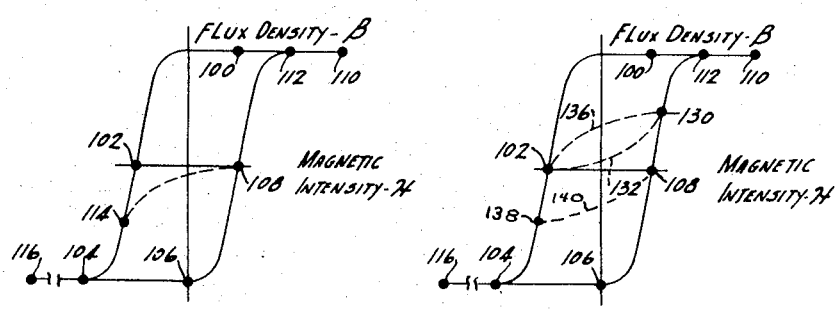
Fig. 6
Fig. 7

3,627,976

NONCONSUMABLE ELECTRODE WELDING METHOD AND POWER SUPPLY

CROSS-REFERENCE TO RELATED APPLICATION

This application is a division of my U.S. application Ser. No. 637,169, filed May 9, 1967, now U.S. Pat. No. 3,497,769, titled, "Non-Consumable Electrode Welding Method and Power Supply Means."

BACKGROUND OF THE INVENTION

1. Field of the Invention

The present invention relates to the field of nonconsumable electrode, alternating-current welding.

2. Description of the Prior Art

Nonconsumable electrode welding may employ a tungsten electrode to establish an arc between the electrode and a workpiece in response to the application of alternating current thereto. The arc melts the workpiece, forming a puddle, to which is added, by hand or machine, filler metal to complete the weld. The puddle is often shielded by inert gas to reduce impurities in the weld. Such a welding process is commonly known as tungsten-inert gas welding or simply TIG welding. It has been difficult, as well as impractical, with presently available apparatus and techniques, to perform such a welding process at high alternating currents.

During such a welding process, there is a natural tendency for the arc to rectify the alternating-current waveform applied to the electrode and the workpiece, thereby effecting an unbalanced current wave shape. The alternating current flows with greater ease from the electrode to the workpiece than from the workpiece to the electrode, causing the half-cycles in which the current is flowing in the former direction to be of a greater magnitude than the half-cycles in which the current is flowing in the latter direction. At times, the rectifying effect of the arc is sufficient to block the flow of current from the workpiece to the electrode, interrupting the current wave.

The above-described phenomenon is due to the dissimilarity of materials employed in the process and to the differing electron emission characteristics of such materials. Thus, the tungsten electrode readily emits electrons in response to the application of electrical energy thereto and permits the current to flow with great ease from the electrode to the workpiece. The workpiece, on the other hand, generally has much lower electron emission characteristics which impede the flow of current from the workpiece to the electrode. In many cases, the current carriers necessary to provide the workpiece-to-electrode current flow are obtained by ionization of the metallic oxides produced during the welding process.

To restore the unbalanced current wave to the balanced condition so as to provide better cleaning action to the welding process, prior art welding power supplies have included a means generating a DC bias sufficient to overcome the rectifying effect of the arc on the current wave. Such means have included an electromotive source, such as a battery, or a resistor-rectifier circuit.

Even with such apparatus, however, when the welding current is increased, a current magnitude is reached at which one or more of the following phenomena occur. The strong arc forces generated by the increased current expel the filler metal from the puddle, making the puddle difficult to control and requiring a high level of operator skill. The large flaring arc produces a wide shallow weld without the degree of penetration necessary to produce sound welds. Welding speeds become exceedingly slow. A large diameter electrode is needed, making the welding electrode equipment heavy and bulky. Current instabilities cause erosion of the electrode and contamination of the weld through "tungsten spitting" in which small portions of the electrode break off and are injected into the weld. Due to the foregoing factors, welding currents in TIG welding have, by way of example, and not of limitation, generally been restricted to below 250 amperes, measured on a root mean square or RMS basis.

SUMMARY OF THE PRESENT INVENTION

It is an object of the present invention to provide an improved alternating current welding method and power supply means which overcomes the aforesaid difficulties and impracticalities and forms superior welds at high welding currents.

It is a further object of the present invention to provide an improved welding method and means of the aforesaid type which obtains the superior high-current welds by controlling the unbalance of the alternating-current wave and by utilizing an electric pinch effect on the arc.

The welding method and power supply means of the present invention contemplate controlling the unbalance of the alternating current wave form by means of the current-limiting saturable reactor of the welding power supply, and more specifically by a construction and mode of operation of the saturable reactor which utilizes reduced reactor flux density. This reduced flux density, 50,000 lines per square inch or less, is considerably below that for which such reactors are normally constructed and at which they are usually operated. Normal saturable reactor flux densities range from approximately 80,000 to 100,000 lines per square inch. The saturable reactor may be constructed without an airgap so as to provide a wide current range to the power supply means while at the same time providing the desired control of the current waveform unbalance. The saturable reactor may have an inductor in the control circuit thereof for controlling the pinch effect of the arc.

The reduced flux density construction and operating mode of the saturable reactor also prevents tungsten spitting by eliminating the causative current instabilities.

Although inductor-saturable reactor circuitry has been included in welding power supplies in the past, the construction and function of such circuitry has been directed toward wave shaping, specifically square wave formation, rather than the control of current wave unbalance. See for example, U.S. Pat. No. 1,612,084 to J. M. Weed, and U.S. Pat. No. 3,150,312 to Willecke, et al., both of which show the use of such circuitry in consumable electrode welding processes. Saturable reactors utilized for such purposes have been constructed in the normal manner so as to operate at flux densities close to the saturation level. As noted supra, for typical transformer steels from which saturable reactors are made, the saturation flux density, and therefore operating flux density, is in the area of 80,000–100,000 lines per square inch. See G. Mueller, *Alternating Current Machines*, 21–23 (1952) and U.S. Steel Corp. *Electrical Steel Sheets*, 4th Ed., 24 (1955). Design of the saturable reactors to operate at or near the saturation flux density provides desired economies in material and size. The inductors incorporated in wave-shaping circuitry have been utilized as harmonic chokes to aid in the wave shaping. They have been designed for operation in the unsaturated state and so operated.

BRIEF DESCRIPTION OF THE DRAWINGS

FIG. 4 is a schematic diagram of the welding power supply of the present invention;

FIG. 5 is a graph showing an alternating-current waveform including current instabilities occurring during the welding process;

FIG. 6 is a graph showing the hysteresis loop of a saturable reactor employed in prior art welding supplies; and FIG. 7 is a graph showing the hysteresis loop of a saturable reactor incorporated in the welding power supply of the present invention and in particular showing the retention of a saturable reactor in the unsaturated state.

DESCRIPTION OF THE PREFERRED EMBODIMENTS

Figure 1:
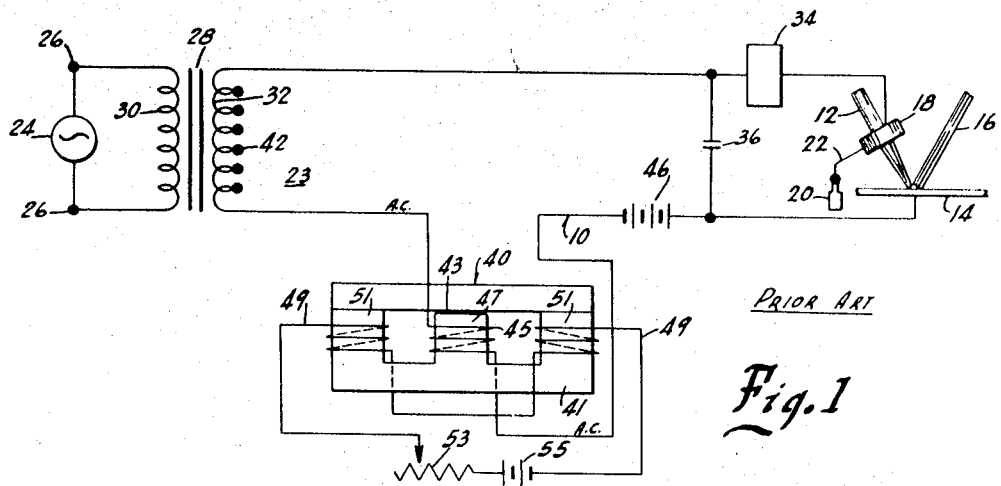
FIG. 1 is a schematic diagram of prior art welding power supply.

Referring now to FIG. 1, a prior art consumable electrode welding apparatus is shown therein, indicated generally by the numeral 10. The apparatus includes a nonconsumable electrode, for example, tungsten electrode 12, for establishing an arc between workpiece 14 and the electrode. Filler metal 16 is added to the weld puddle formed by the arc between electrode 12 and workpiece 14. The puddle may be shielded from the atmosphere by inert gas supplied to collar 18 on electrode 12 from tank 20 by pipe 22.

The arc between electrode 12 and workpiece 14 is generated by an alternating-current power source, shown diagrammatically as single-phase alternator 24, which supplies alternating current to terminals 26 of welding power supply 23. The welding power supply 23 includes a transformer 28, having primary windings 30 connected to terminals 26 to provide a current wave of alternately bidirectional half-cycles to electrode 12 and workpiece 4 by means of secondary winding 32. The secondary circuit of transformer 26 may include a high-frequency generator 34 in series with electrode 12 and workpiece 14. Generator 34, which may be a spark gap generator, aids in the reignition of the arc between electrode 12 and workpiece 14 by superimposing a high-frequency signal on the current wave. A stabilizing capacitor 36 may be connected in parallel with electrode 12 and workpiece 14. Transformer 28 may contain taps 42 on the windings to vary the voltage to a desired level.

A means to vary the current magnitude to the desired level, such as saturable reactor 40, may be provided in welding power supply 23. Saturable reactor 40 includes core 41 having airgap 43 which provides the desired wave shape to the current wave. A load winding 45 is mounted on center leg 47 of core 41 while a control winding 49 is mounted on each of outer legs 51. Control windings 49 are energized by a direct current source shown diagrammatically as resistor 53 and battery 55 so as to control the level of the current wave generated by transformer 28. In accordance with conventional prior art practices, saturable reactor 40 is operated at a flux density level of 80,000–100,000 lines per square inch.

Figure 2:
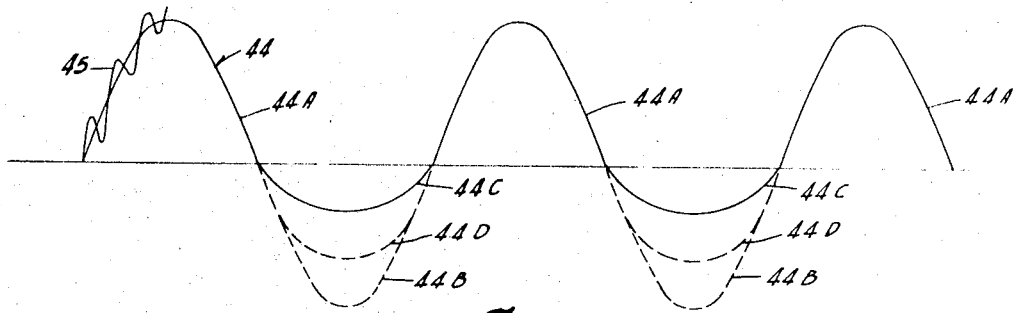
FIG. 2 is a graph showing the alternating-current wave utilized in alternating-current welding processes.

As shown in FIG. 2, alternating-current power source 28 and transformer 28 generate current wave 44. This current wave is of the normal, balanced, sinusoidal character of alternating current and contains half-cycles of one direction of current flow, the magnitude of which is shown by the area under graph 44A, and half-cycles of the other direction of current flow, the magnitude of which is shown by the area under graph 44B. These half-cycles of current flow are equal in magnitude to each other so that the ratio of the current magnitude of alternate half-cycle 44A to the current magnitude of alternate half-cycle 44B is one to one. The relationship of alternate half-cycle 44A to alternate half-cycle 44B may also be expressed in terms of percentages. If the total area under both graph 44A and 44B is considered to be 100 percent, then the area, or current magnitude, of half-cycle 44A is 50 percent and the area, or current magnitude of half-cycle 44B is also 50 percent. By way of example, the current flow of alternate half-cycle 44A may represent arc current flowing from electrode 12 to workpiece 14 while alternate half-cycle 44B represents current flow from workpiece 14 to electrode 12. Current wave 44 may have superimposed thereon high-frequency signal 45 from high-frequency generator 34.

When applied to electrode 12 and workpiece 14 during the welding process, current wave 44 generates an arc between the electrode and the workpiece. Current wave 44 is unbalanced due to the fact the current passes more easily from electrode 12 to workpiece 14 than from workpiece 14 to electrode 12. This tends to reduce the magnitude of alternate half-cycle 44B to the magnitude shown by the graph 44C. The current magnitude ratio between the current represented by graph 44A and the current represented by graph 44C becomes approximately 3 to 1. The current unbalance condition may be expressed in percentages as half-cycle 44A occupying 90 percent of the area under the current wave graph and half-cycle 44C occupying 10 percent.

Figure 3:
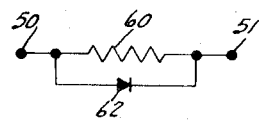
FIG. 3 is a partial schematic diagram of another circuit element that may be incorporated in the prior art embodiment of FIG. 1.

To overcome this unbalance, prior art power supplies have generally included a direct current bias means which attempts to restore half-cycles 44C to the magnitude of the half-cycles indicated by 44B. Typically, battery 46 may be connected in series with transformer 28 in a manner to aid the flow of current from workpiece 14 to electrode 12 during half-cycles 44C. The resistor-diode circuit of FIG. 3 may also be used.

Although welding apparatus 10 provides clean, satisfactory welds at low or moderate welding current, it is completely unsatisfactory for welding at high currents for the previously stated reasons. In accordance with the present invention, it has been found that by altering the ratio of the current magnitudes of the alternate half-cycles of current wave 44 to the point where the magnitude of alternate half-cycle 44A is from between 1.5 to less than three times greater than the magnitude of the other alternate half-cycle, shown as 44D in FIG. 2, the nonconsumable electrode welding process may be carried out at the high welding current. The cleaning action of the arc is not appreciably altered. Within the aforementioned range current magnitude ratios of from 1.8 to 2.5 to 1 have proven most satisfactory. Expressed in terms of percentages, a ratio of 80–20 percent has been found to be preferable.

The preferred embodiment of the means to control current wave unbalance is shown in FIG. 4 and comprises magnetic means having adjustable impedance. In the welding power supply 23 of FIG. 4, saturable reactor 70, which may have inductance 72 in the control circuit thereof, is utilized to control both the magnitude of the welding current over the operating range of the power supply and the unbalance of the current wave in the high-current portion thereof.

As is well known in the art, saturable reactor 70 is a circuit element of controllable impedance. The reactor includes iron cores 73 and 75 of hollow rectangular construction. Although cores 73 and 75 have, in the past, incorporated airgaps for wave-shaping purposes, it has been found preferable in the present invention to utilize cores without intentional airgaps. This increases the range of currents over which saturable reactor 70 may operate. Load windings 74 are wound on legs 77 and 79 of cores 73 and 75 and are connected in series with workpiece 14 and electrode 12, so that one of the cores provides a current-limiting impedance, or is the current-limiting state, for each half-cycle of alternating-current wave 44. Control winding 76 is wound so as to surround adjacent legs 77 and 79 of the cores and is connected to a source of control current 80.

In operation, the impedance of saturable reactor 70 may be controlled by adjusting the magnitude of the current in control winding 76 so as to vary the magnetic flux conditions in cores 73 and 75. With a large current in control winding 76, the core flux is high and the impedance of load windings 74 is low. A large welding current is thus supplied to workpiece 14 and electrode 12.

When the current in the control winding 76 is reduced, the core flux decreases, the impedance of load winding 74 increases and the current to workpiece 14 and electrode 12 is reduced. Thus, by varying the current in control winding 76, the welding current from welding power supply 23 may be adjusted to the desired level.

Welding power supply 23 may be provided with an adjustable inductor or choke 72 in the control circuit 80 providing current to saturable reactor control winding 76. Control circuit 80 may include a source of direct current such as center tapped transformer 82 connected to alternating-current power source 24 and to controlled rectifiers 84. In addition to rectifying the alternating current from alternating power source 26 into direct current, controlled rectifiers 84 may control the magnitude of the direct current through adjustment of their conduction interval, as by firing circuit 86. Firing circuit 86 applies firing signals to the rectifiers to render them conductive at the desired points in the alternating-current cycle of alternating-current power supply 24. Other sources of direct current may, of course, be used.

A typical adjustable inductor 72 may comprise a pair of L-shaped members 88 juxtapositioned to form a rectangle as shown in FIG. 4. A small airgap, the size of which may be adjusted, exists between the adjacent portions of members 88. Each of the members 88 contains a winding 90, the two windings being connected in series with each other and in series with the control winding 76 and control circuit 80.

By way of example, in a typical inductor 72 operating at a 60-ampere DC level, members 88 are approximately 5½ inches long and have a cross-sectional area of 2½ inches. One hundred forty turns of wire are provided on each member. The airgap between adjacent portions of the members 88 is 0.01 inch. The inductance of an inductor so constructed is 190 millihenries and is such as to cause the inductor to saturate at high-current welding conditions thereby providing an increased peak current condition to the current wave. This increased peak current condition develops electric pinch forces which prevent the arc from flaring.

It will be appreciated that the inductance and saturation point of inductor 72 may be varied in other ways than by adjustment of the airgaps between the members. For example, the airgap may be held constant and windings 90 provided with taps 91 which may be used to vary the number of turns in windings 90. In the alternative, the shape and size of members 88 may be varied to adjust the inductance of inductor 72. However, regardless of the manner of adjustment, it is important to the present invention that the inductance of inductor 72 be such as to cause it to move from the saturated to the unsaturated condition under high welding current conditions.

Returning to saturable reactor 70, it is similarly important to the present invention that saturable reactor 70 be constructed so that it operates at a flux density of less than 50,000 lines per square inch so as to control the current wave unbalance. As a guide, the following formula may be used:

$$NA > = \frac{E_{rms}}{4.44 \times f \times 5 \times 10^{-4}}$$

where $N$ is the number of saturable reactor alternating current load winding turns on one leg of the core, such as leg 79 of core 73; $A$ is twice the cross-sectional area of the leg surrounded by the alternating current turns; $E_{rms}$ is the voltage at the secondary winding 32 of transformer 28; and $f$ is the line frequency. For example, if the frequency is 60 cycles per second and the transformer secondary voltage is 80 volts:

$$NA > = \frac{80}{4.44 \times 60 \times 5 \times 10^{-4}}$$

or 600 turns/in.² Thus, the combination of turns and area of the leg of the core must exceed 600 to insure that saturable reactor 70 operates at a flux density of less than 50,000 lines per square inch. As noted in the summary, the magnitude of the flux density of saturable reactor 70 is approximately one-half the normal magnetic core operating flux density of 80,000 to 100,000 lines per square inch.

Saturable reactor 70 may also be used to provide stability or protection to welding power supply 23 against transient, short term, excessive currents caused by an interruption of the current wave resulting from the natural rectifying action of the arc between electrode 12 and workpiece 14. Such short term current instabilities are responsible for tungsten spitting during the welding process. Referring to FIG. 5, the unbalanced current wave resulting from the natural rectifying action of the arc between electrode 12 and workpiece 14 is shown therein. The current wave thus consists of alternate half-cycles 44A and alternate half-cycles 44C or alternate current half-cycles 44D, depending on the unbalance of current wave 44. Due to aberrations occurring during the welding process, the natural rectification of the arc may occasionally be so great as to fully and completely block current flow from workpiece 14 to electrode 12, interrupting the current wave and producing an interval of zero current 44E between alternate half-cycles 44A. As more fully explained below, such an interruption in the current wave causes the next alternating-current half-cycle 44A to be of excessive current magnitude, as shown in FIG. 5 by the graph 44F. It is this excessive current half-cycle 44F that causes tungsten spitting.

The production of excessive current half-cycle 44F may be more fully understood by reference to FIG. 6, which shows a typical hysteresis diagram loop for the core of a saturable reactor operating at a flux density of 100,000 lines per square inch in accordance with common prior art usage. A saturable reactor of the type shown in FIG. 4 is described in exemplary fashion below and is identified by the same numerals used in that figure. Under normal current-regulating conditions, that is, operation of saturable reactor 70 with the current wave shown in FIG. 2 and comprised of half-cycle 44A and alternating half-cycle 44C or 44D, during the time core 73 is impeding current flow, the magnetic condition of core 73 will trace a pattern starting at point 100 and moving along the hysteresis loop through points 102, 104, 106 to point 108. This may occur, for example, when alternating current half-cycle 44A of the current wave is present in load windings 74. Point 108 is the magnetic flux condition established by the current in control winding 76. During alternate half-cycle 44C of current wave 44, when core 75 is impeding current flow, the condition of core 73 will move from point 108 through points 110, 112, back to point 100, thus completing the hysteresis loop. Core 73 will present little impedance to the current of half-cycle 44C but core 75 will act to limit the current to the desired value so that the level of the current wave and the welding current remains at the desired value.

Considering now the operation of the saturable reactor 70 at a 100,000 lines per square inch level under the conditions shown in FIG. 5, and including the interrupted portion of current wave 44E, the condition of core 73 during alternate half-cycle 44A will be the same as described above and at the end of the half-cycle, the condition of core 73 will be at point 108. However, as the next half-cycle does not appear, due to interruption 44E, the condition of core 73 remains at point 108. During the alternate half-cycle 44A subsequent to interruption 44E, the magnetic condition of core 73 will change from point 108 through 114, 104, 116, 106 and back to point 108. As the portion of the loop from point 104 through point 116 to point 106 offers very little impedance, due to the saturation of the core 73, the surge in the current wave identified by graph 44F occurs. The failure of the condition of core 73 to move back to point 100 due to the current interruption is termed a failure of the saturable reactor core 73 to "reset."

By operating the saturable reactor 70 at the level of 50,000 lines per square inch in accordance with the teachings of the present invention, the transiently excessive current half-cycle may be prevented, as shown in FIG. 7. Under normal current-regulating conditions, that is, with current wave 44 shown in FIG. 2, during alternate half-cycle 44A, the condition of core 73 of saturable reactor 70 starts a point 100 and moves through point 102 to point 130 via graph 132 and provides a limiting impedance to the current during this half-cycle. During alternate half-cycle 44C or 44D, the core condition moves from point 130 through points 110 and 112 back to point 100, thus completing the hysteresis loop.

Under the conditions shown in FIG. 5, in which the current wave includes current interruption 44E, during alternate half-cycle 44A, the condition of core 73 traces the same path as described above. During interruption 44E the condition of the core remains at point 130. During the next half-cycle 44A, the condition of core 73 moves from point 130 through point 102, via graph 136, point 138, point 108 via graph 140 to point 130. No excessive current half-cycle 44F appears because the saturable reactor does not go into saturation, as for example, from point 104 to point 116, but rather limits the current of the half-cycle to the magnitude shown by the graph 44A. Current stability among the half-cycles of the current wave is thus achieved. In the next half-cycle 44C or 44D the condition of core 73 moves from point 130 to point 110, 112, back to point 100 returning the condition of the core to its original state.

I claim:

1. In an arc-welding system including an alternating-current power source, an electrode, and a workpiece, the improvement comprising, a welding power supply for providing alternating current from said alternating current power source for forming a welding arc between said electrode and said workpiece over a current range having a high-current portion, said welding power supply comprising, means connected to the power source for supplying a high-current wave of alternately bidirectional half-cycles to said electrode and said workpiece; and means including a variable-impedance reactor for regulating the magnitude of said current wave of bidirectional half-cycles over the current range, said reactor having a magnetic core and load windings wound on said magnetic core and connected in series with said supply means, said electrode and said workpiece for receiving the current wave of bidirectional half-cycles, said core having a minimum cross-sectional area and said load windings having a number of turns such as to provide a maximum flux density in said core of 50,000 lines per square inch or less during normal current regulating action in the high-current portion of the current range.

2. The welding power system according to claim 1 wherein said saturable reactor is so constructed and formed that the product of the number of load winding turns and twice the cross-sectional area of the portion of the magnetic core surrounded by the turns is greater than $$\frac{E_{rms}}{4.44 \times f \times 5 \times 10^{-4}}$$

where $E_{rms}$ is the voltage of said supply means and $f$ is the frequency of the alternating-current power source.

3. The welding power system according to claim 1 wherein the magnetic core of said saturable reactor defines an essentially closed magnetic flux path.

4. The arc-welding system according to claim 1 wherein said saturable reactor includes a control winding wound on said magnetic core and further including a current supply circuit connected to said control winding, and an inductor including a core having a winding thereon connected to said control winding and to said current supply circuit for varying the impedance of said load winding by varying the current energization of said control winding, said inductor being so constructed and formed as to develop a low value of inductance in the high-current portion of said current range and a high value of inductance in the remaining portions of said current range.

5. The welding system according to claim 4 wherein said core of said inductor includes an airgap for regulating the inductance thereof.

6. The welding system according to claim 4 wherein said inductor includes means for adjusting the inductance thereof.

7. In an arc-welding system including an alternating-current power source, an electrode and a workpiece, the improvement comprising an arc-welding power supply for providing an alternating current from the alternating-current power source to the electrode and the workpiece to form a welding arc therebetween over a current range having a high-current portion, said welding power supply comprising, means operatively connected to the power source for supplying a high-current wave of alternating bidirectional half-cycles to said electrodes and said workpiece, a variable-impedance saturable reactor connected to said supply means for regulating the magnitude of the current wave of bidirectional half-cycles, said reactor having a magnetic core, a load winding wound on said magnetic core and connected in series with said electrode and said workpiece said core having a minimum cross-sectional area and said load winding having a number of turns such as to provide a maximum flux density in said core of 50,000 lines per square inch during normal current regulating action in the high-current portion of the current range, and a control winding wound on said magnetic core, a current supply circuit connected to said control winding for varying the impedance of said load winding, and an inductor having a core and a winding thereon connected between said control winding and said current supply circuit, said inductor being so constructed and formed as to develop a low value of inductance in the high-current portion of the current range and a high value of inductance in the remaining portions of the current range.

8. The welding system according to claim 7 wherein said core of said inductor includes an airgap for regulating the inductance thereof.

9. The welding system according to claim 7 wherein said inductor includes means for adjusting the inductance thereof.

10. A method of generating an alternating-current welding arc between a nonconsumable electrode and a workpiece, said welding arc being generated over a current range having a high-current portion and a low-current portion, the electrode and the workpiece having a saturable reactor in series therewith for controlling the welding current, said method comprising the steps of impressing a high-current wave of alternately bidirectional half-cycles between the electrode and the workpiece for forming a welding arc, said welding arc impeding current flow in one direction between the electrode and the workpiece and operating the saturable reactor at a flux density of 50,000 lines per square inch or less when controlling the magnitude of the welding current thereby to restrict the ratio of the magnitude of the alternate half-cycles of current flow in one direction in said current wave to the alternate half-cycles of current flow in the other direction to a ratio suitable for welding in the high-current portion of the current range.

11. The method in accordance with claim 10 further defined as including the step of controlling the ratio of the magnitude of the alternating half-cycles of current flow in one direction in said current wave to the magnitude of the alternating half-cycles of current flow in the opposite direction in said current wave in order to provide one ratio thereof in the high-current portion of the current range and another ratio thereof in the low-current portion of the current range.

12. The method in accordance with claim 11, the reactor having a load winding connected in series with the workpiece and the electrode and a control winding connected to a current supply circuit for varying the impedance of the load winding, further defined as controlling said ratio by operating an inductor in series with the control winding, the inductor having a low value of inductance to determine said ratio at the high-current portion of the current range and a high value of inductance to determine said ratio at the low-current portion of the current range.

13. A method of generating an alternating-current welding arc between a nonconsumable electrode and a workpiece, said welding arc being generated over a current range having a high-current portion and a low-current portion, the electrode and the workpiece having a saturable reactor in series therewith for controlling the welding current, said method comprising the steps of impressing a current wave of alternately bidirectional half-cycles of the current range between the electrode and the workpiece for forming a welding arc, and operating the saturable reactor at a maximum flux density of 50,000 lines per square inch when controlling the magnitude of the welding current, and controlling the ratio of the magnitude of the alternate half-cycles of current flow in one direction in said current wave to the magnitude of the alternating half-cycles of current flow in the opposite direction in said current wave in order to provide one ratio thereof in the high-current portion of the current range and another ratio thereof in the low-current portion of the current range.

14. The method in accordance with claim 13, further defined as controlling said ratio by operating an inductor connected to control the reactor, the inductor having a low value of inductance to determine said ratio at the high-current portion of the current range and a high value of inductance to determine said ratio at the low-current portion of the current range.

* * * * *